US008837551B2

(12) United States Patent
Duan et al.

(10) Patent No.: US 8,837,551 B2
(45) Date of Patent: Sep. 16, 2014

(54) METHOD FOR GENERATING HIGH POWER ELECTROMAGNETIC RADIATION BASED ON DOUBLE-NEGATIVE METAMATERIAL

(75) Inventors: Zhaoyun Duan, Chengdu (CN); Xin Guo, Chengdu (CN); Chen Guo, Chengdu (CN); Yubin Gong, Chengdu (CN); Min Chen, Cambridge, MA (US)

(73) Assignee: University of Electronic Science and Technology of China, Chengdu, Sichuan Province (CN)

( * ) Notice: Subject to any disclaimer, the term of this patent is extended or adjusted under 35 U.S.C. 154(b) by 100 days.

(21) Appl. No.: 13/589,930

(22) Filed: Aug. 20, 2012

(65) Prior Publication Data

US 2014/0048725 A1 Feb. 20, 2014

(51) Int. Cl.
*H01S 3/09* (2006.01)

(52) U.S. Cl.
USPC .................... 372/74; 372/73; 372/66; 372/20

(58) Field of Classification Search
CPC ....... H01S 3/0959; H01S 3/0955; H01S 3/09; H01S 3/09707; H01S 3/06
USPC .......................................... 372/74, 73, 66, 20
See application file for complete search history.

(56) References Cited

U.S. PATENT DOCUMENTS

| | | | | |
|---|---|---|---|---|
| 7,421,178 | B2 * | 9/2008 | Podolskiy et al. | 385/129 |
| 8,072,386 | B2 * | 12/2011 | Lier et al. | 343/786 |
| 2009/0262766 | A1 * | 10/2009 | Chen et al. | 372/26 |
| 2010/0141358 | A1 * | 6/2010 | Akyurtlu et al. | 333/219.1 |
| 2010/0195675 | A1 * | 8/2010 | Moloney et al. | 372/4 |
| 2010/0303123 | A1 * | 12/2010 | Li | 372/98 |
| 2012/0212395 | A1 * | 8/2012 | Sanada | 343/912 |

* cited by examiner

*Primary Examiner* — Kinam Park

(57) ABSTRACT

A method for generating high power electromagnetic radiation based on double-negative metamaterial (DNM), includes providing electrons of an electron beam moving in a vacuum close to an interface between the DNM and the vacuum at a predetermined average speed larger than a phase velocity of an electromagnetic wave propagating in the DNM so as to generate coherent high power radiation. The method can be applied but not limited to high power and compact Terahertz radiation sources and Cherenkov particle detectors and emitters.

8 Claims, 7 Drawing Sheets

METHOD FOR GENERATING HIGH POWER ELECTROMAGNETIC RADIATION BASED ON DOUBLE-NEGATIVE METAMATERIAL

BACKGROUND OF THE PRESENT INVENTION

1. Field of Invention

The present invention relates to a field of high frequency, high power and small-sized vacuum electronic devices mainly applied but not limited to high power and small-sized Terahertz radiation sources and Cherenkov particle detectors and emitters based on reversed Cherenkov radiation effect.

2. Description of Related Arts

Terahertz radiation comprises coherent electromagnetic radiation roughly in a range from 0.1 to 10 THz and narrowly in a range from 0.3 to 3 THz between the short-wavelength edge of microwave band and the long-wavelength edge of far-infrared light. Terahertz technology causes an extensive research boom around the world. This is because Terahertz electromagnetic wave has many novel electromagnetic features and potential applications. First of all, Terahertz radiation has stronger penetrativity than infrared light and visible light and is able to penetrate cloth, plastic and others with little attenuation, so the Terahertz radiation can be applied in aspects of safety surveillance, radar and communications. Secondly, the Terahertz radiation has photon energy far lower than X ray, and thus the Terahertz radiation does no big harm to organism tissues and DNA molecules and can be applied in biomedicine fields including DNA detection, genetic analysis and tomographic imaging. Thirdly, Terahertz spectrum is able to carry much information about a compound, including biochemical constituents and spectrum features, and plays an extremely important role in biochemistry and other fields. However, a lack of high power Terahertz radiation sources hinders the Terahertz technology from being realized in many of the above fields.

Metamaterials are artificially structured materials with unusual electromagnetic properties that are not found in natural materials. One of the metamaterials is Double-Negative Metamaterial (DNM) whose effective permittivity and permeability both have negative real parts. The DNM has some novel electromagnetic features, such as negative refractive index, reversed Cherenkov radiation, reversed Doppler effect, reversed refraction law and so on. A realization of the DNM is rated by the American magazine, Science, as one of the top ten technological breakthroughs of 2003 because of promising theoretical values and wide application prospects thereof; the "invisible cloak" made of the metamaterials is also rated by Science as one of the ten technological breakthroughs of that year in 2006; and the metamaterials are rated by Science as one of the insights of the Decade in 2010.

An article of *Čerenkov radiation in materials with negative permittivity and permeability* (Opt. Express, 11, 723, 2003) written by J. Lu et al from MIT introduces reversed Cherenkov radiation effect generated by a single charged particle passing through infinitely large isotropic DNM, wherein the authors made thorough researches respectively about the reversed Cherenkov radiation under conditions of loss and dispersion. In an article of *Cherenkov radiation by an electron bunch that moves in a vacuum above a left-handed material* (Phys. Rev. B, 72, 205110, 2005), Y. O. Averkov et al theoretically studied Cherenkov radiation by an electron bunch that moves in a vacuum above an isotropic DNM and results thereof show that the Cherenkov radiation in the isotropic DNM has "reversed" features. S. N. Galyamin et al theoretically analyzed reversed Cherenkov radiation and transition radiation generated by a single charged particle crossing through a DNM boundary in an article of *Reversed Cherenkov-Transition Radiation by a Charge Crossing a Left-handed Medium Boundary* (Phys. Rev. Lett., 103, 194802, 2009). Z. Y. Duan et al thoroughly studied about reversed Cherenkov radiation in a circular waveguide fully or partially filled with DNM and effective methods for enhancing the radiation in articles including *Reversed Cherenkov radiation in a waveguide filled with anisotropic double-negative metamaterials* (J. Appl. Phys., 104, 063303, 2008), *Cherenkov radiation in anisotropic double-negative metamaterials* (Opt. Express, 16, 18479, 2008) and *Enhanced reversed Cherenkov radiation in a waveguide with double-negative metamaterials* (Opt. Express, 19, 13825, 2011), wherein the conventional electromagnetic radiation has potential applications to Cherenkov particle detectors and emitters and high frequency, high power electromagnetic radiation sources. In an American patent Smith-Purcell radiation source using negative-index metamaterial (U.S. Pat. No. 7,397,055 B2 July 2008), D. L. Barker et al disclosed periodic grating structure formed by Negative Index Metamaterials (NIMs) as shown in FIG. 1, by which Smith-Purcell radiation is enhanced when an electron beam moves close to a surface of the grating structure compared to the normal metal gratings case. In a latest article of *Novel electromagnetic radiation in a semi-infinite space filled with a double-negative metamaterial* (Phys. Plasmas, 19, 013112, 2012) written by Z. Y. Duan et al, the authors proved that when a single charged particle moves in a vacuum close to an interface between isotropic DNM and vacuum, reversed Cherenkov radiation is formed in the DNM as shown in FIG. 2 and surface wave (SW) amplitude in vacuum is obviously enhanced compared to normal dielectric materials case, as shown in FIG. 3; the authors put forward a Chinese patent application on May 27, 2011 (application number: 201110139754.1; isotropic Double-Negative artificial Metamaterials; inventors: Z. Y. Duan, C. Guo, T. Tang; status: being processed).

SUMMARY OF THE PRESENT INVENTION

An object of the present invention is to provide a method for generating high power electromagnetic radiation based on DNM (Double-Negative Metamaterial) and electron beams with high current under a condition of high power Cherenkov radiation being produced so as to greatly increase output radiation intensity.

Accordingly, the present invention adopt following technical solutions. A method for generating high power electromagnetic radiation based on DNM, in which an electron beam moves in vacuum close to the interface between the DNM and the vacuum at a desired average speed so as to generate coherent high power radiation.

Further, the desired average speed is larger than a phase velocity of electromagnetic wave propagating in the DNM which can be rectangular parallelepiped, cylindrical, wedge-shaped or other alternatives which a skilled artisan knows how to use.

Further, the electron beam is a cylindrical electron beam, an electron sheet beam or an elliptical electron beam, and other alternatives which a skilled artisan knows how to use, whose beam dimensions are smaller than an operation wavelength thereof. The electron beam can be pulsed, continuous or circulating.

Further, by changing DNM parameters and electron beam parameters, SW amplitude and reversed Cherenkov radiation energy are greatly enhanced.

The change of the DNM parameters comprises increasing a filling factor and decreasing loss, wherein increasing the filling factor is realized by adjusting a size of metal split-ring resonator (SRR) of the DNM to increase magnetic resonant intensity thereof; decreasing loss is realized by choosing different dielectric materials and metal materials to decrease magnetic loss $\gamma_m$ of the DNM so as to increase magnetic resonant performance thereof.

The change of the electron beam parameters comprises adding electron numbers of the electron beam, increasing a transverse dimension of the electron sheet beam and providing the electron beam moving close to the DNM.

It must be ensured that dimensions of the electron beam are smaller than one operation wavelength while changing the electron beam parameters.

Further, an isotropic double-negative metamaterial is formed by a plurality of unit cells periodically arranged along three-dimensional directions of a rectangular coordinate system respectively, wherein each unit cell is formed by etching a metal SRR, a symmetrical ring, a nested ring, an S-shaped resonant ring or an Ω-ring resonant structure and wire, or other alternatives which a skilled artisan knows how to use, on a face of a dielectric substrate and on an opposite face thereof respectively. The shape of this DNM is rectangular parallelepiped or wedge-shaped for sheet or elliptical electron beams and cylindrical for circulating electron beams.

According to physical principle of the reversed Cherenkov radiation, the electron beam moves in the vacuum close to the interface between the DNM and the vacuum at the desired average speed larger than the phase velocity of electromagnetic wave propagating in the DNM and mutually interact with the DNM so as to generate the high power reversed Cherenkov radiation (as 6 in FIG. 4); meanwhile, since in the vacuum Cherenkov radiation condition is not satisfied, an SW characterized by a time-averaged Poynting vector amplitude $|\langle\bar{S}\rangle|$ is generated. 4 and 5 in FIG. 4 show directions thereof. When leaving the interface between the vacuum and the DNM, the SW would attenuate exponentially. Because the DNM has obvious resonant features, compared to a condition of normal dielectric materials, SW amplitude is greatly enhanced, which is an obvious advantage of using DNM. Meanwhile, by changing the DNM parameters, the phase velocity of the electromagnetic wave propagating in the DNM is greatly decreased, in such a manner that according to the Cherenkov radiation principles an accelerating potential for generating electron beams is greatly lowered so as to miniaturize a device thereof.

In order to realize that permittivity and permeability of the DNM have negative real parts, the DNM can adopt the plurality of unit cells formed by periodically arranging the metal SRRs, the symmetrical rings, the nested rings, the S-shaped resonant rings or the Ω-ring resonant structures and wires, or other alternatives which a skilled artisan knows how to use, wherein the ring structures such as the SRR generate the effective permeability having the negative real part; rod structures such as the wires generate the effective permittivity having the negative real part. A typical DNM is formed as follows. The metal SRR 8 in FIG. 5A and the wire 9 in FIG. 5A are fixed on two faces of the dielectric substrate 10 in FIG. 5A so as to form a unit cell 1 in FIG. 4; the plurality of unit cells are periodically arranged along the three-dimensional directions of the rectangular coordinate system respectively so as to form the isotropic double-negative metamaterial 2 in FIG. 4, specifically shown in FIG. 5B. The double-negative metamaterial has features of a three-dimensional structure and isotropy, whose size can be flexibly designed according to the operation frequency band and fabrication process. The DNM has been thoroughly disclosed in the Chinese patent application 201110139754.1.

A high-current-density and high-current electron beam 3 in FIG. 4 which can be the cylindrical electron beam, the electron sheet beam, the elliptical electron beam, or other alternatives which a skilled artisan knows how to use, is generated by using an electron gun 7 in FIG. 4. For a pulse electromagnetic wave, beam dimensions thereof are required to be smaller than an operation wavelength thereof to generate the coherent radiation. For example, if the electron sheet beam is used to generate an electromagnetic wave at 1 THz, the dimensions of the electron sheet beam as shown in FIG. 6 $2x_0 \times 2y_0 \times 2z_0$ are all smaller than 300 μm. For continuous electromagnetic wave, the electrons of the electron beam move at an average speed slightly larger than the phase velocity of the electromagnetic wave propagating in the DNM so as to generate the coherent radiation.

Compared to conventional arts, the present invention has following advantages.

The present invention replaces a single charged particle with the high-current-density and high-current electron beam moving in the vacuum close to the interface between the DNM and the vacuum to generate the coherent high power radiation as shown in FIG. 4, which can be applied in high power and small-sized Terahertz radiation sources and Cherenkov radiation particle detectors and emitters.

The present invention provides the method for generating high power tunable Terahertz radiation based on the isotropic DNM and the high-current electron sheet beam.

These and other objectives, features, and advantages of the present invention will become apparent from the following detailed description, the accompanying drawings, and the appended claims.

DETAILED DESCRIPTION OF THE PREFERRED EMBODIMENT

Figure 1:
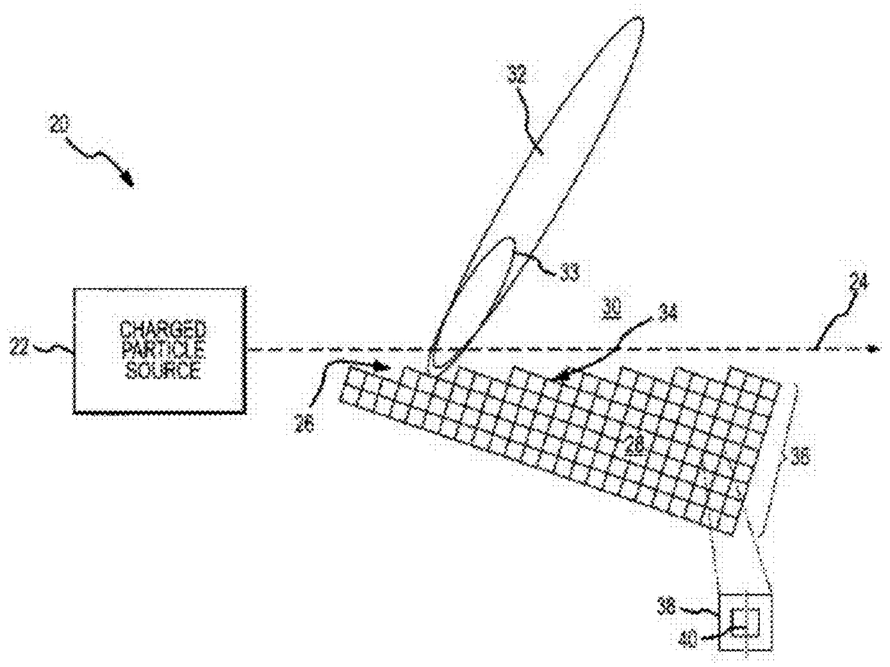
Fig. 1 (prior art)
FIG. 1 is a sketch view of Smith-Purcell radiation by a periodical grating structure based on negative index metamaterials (NIMs) according to prior arts, wherein 20—Smith-Purcell radiation source; 22—charged particle source; 24—charged particle beam; 26—periodic array of interface discontinuities; 28—NIM; 30—normal dielectric material; 32—enhanced Smith-Purcell electromagnetic radiation; 33—radiation emitted from a conventional grating formed from a material having a positive index of refraction; 34—a grating formed of a Negative—Index Metamaterial; 36—resonant structure; 38—SRR; 40—rod structure.
Figure 2:
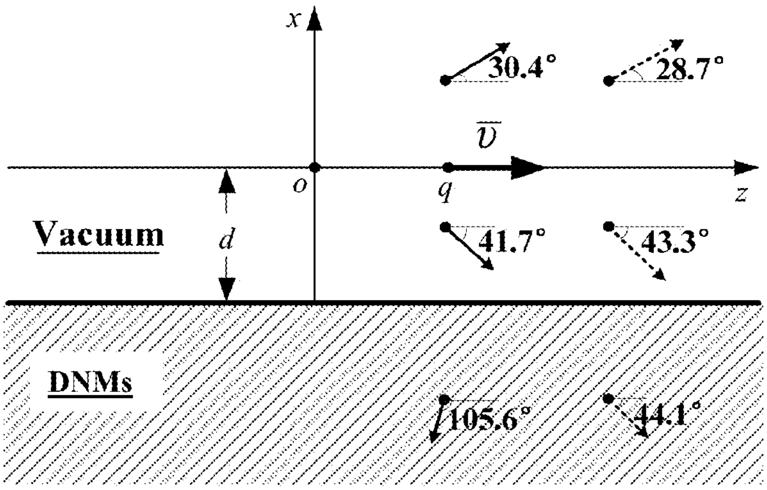
Fig. 2 (prior art)
FIG. 2 is a sketch view of DNM and time-averaged Poynting vectors in a vacuum according to the prior arts.
Figure 3:
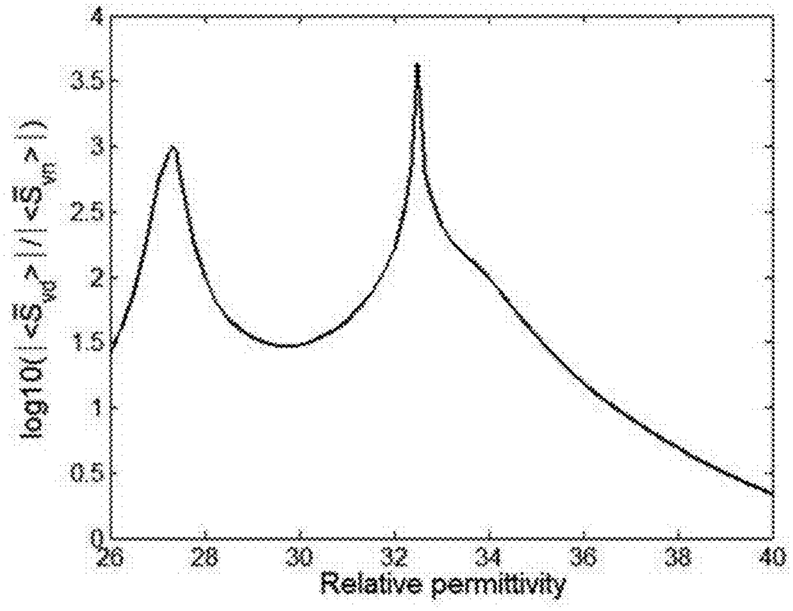
Fig. 3 (prior art)
FIG. 3 is a comparison diagram of the time-averaged Poynting vector amplitude under conditions of the DNM and the normal dielectric material according to the prior arts.
Figure 4:
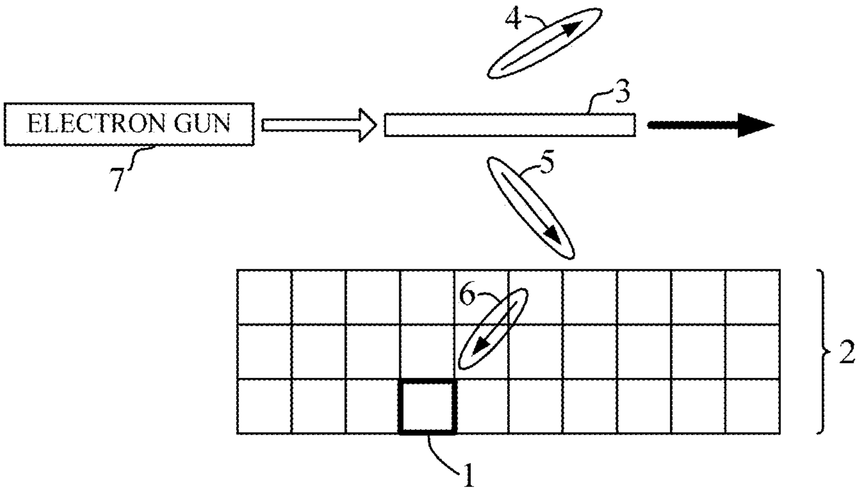
FIG. 4 is a sketch view of generation of an electron beam and mutual interaction between the electron beam and the DNM to generate high power electromagnetic radiation according to a preferred embodiment of the present invention, wherein 1 is a unit cell of the DNM; 2 is an isotropic DNM formed by a plurality of unit cells periodically arranged; 3—electron beam; 4 and 5—radiation directions of SW; 6—radiation direction of reversed Cherenkov radiation; 7—electron gun.
Figure 5A:
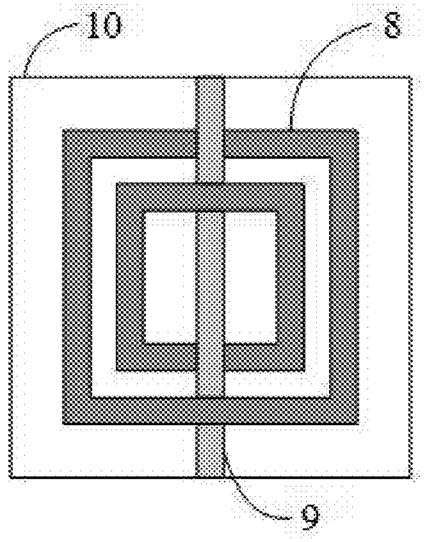
FIG. 5A is a sketch view of the unit cell of the DNM formed by fixing a metal SRR 8 and wire 9 on two faces of a dielectric substrate 10 according to the preferred embodiment of the present invention.
Figure 5B:
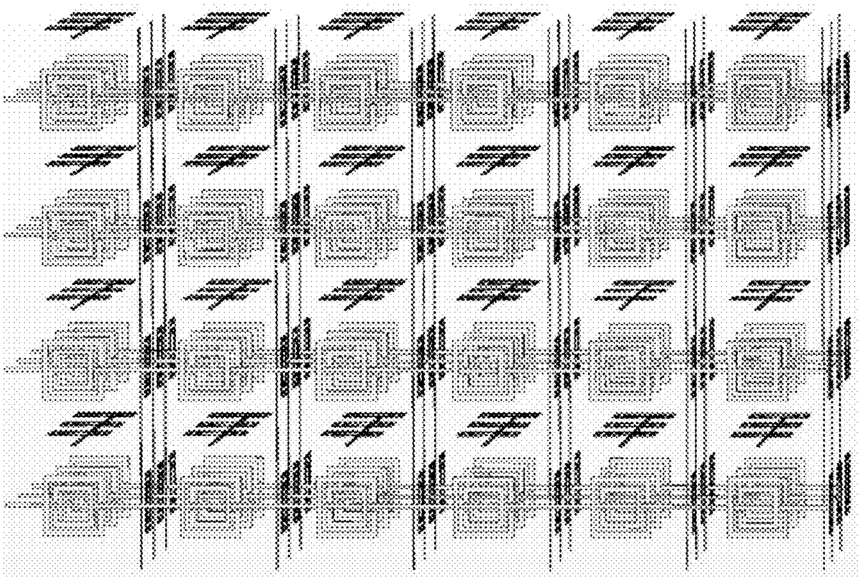
FIG. 5B is a perspective view of an isotropic DNM formed by inserting the dielectric substrate with the metal SRRs and the wires into holes opened in a solid cube of polyimide according to the preferred embodiment of the present invention.
Figure 6:
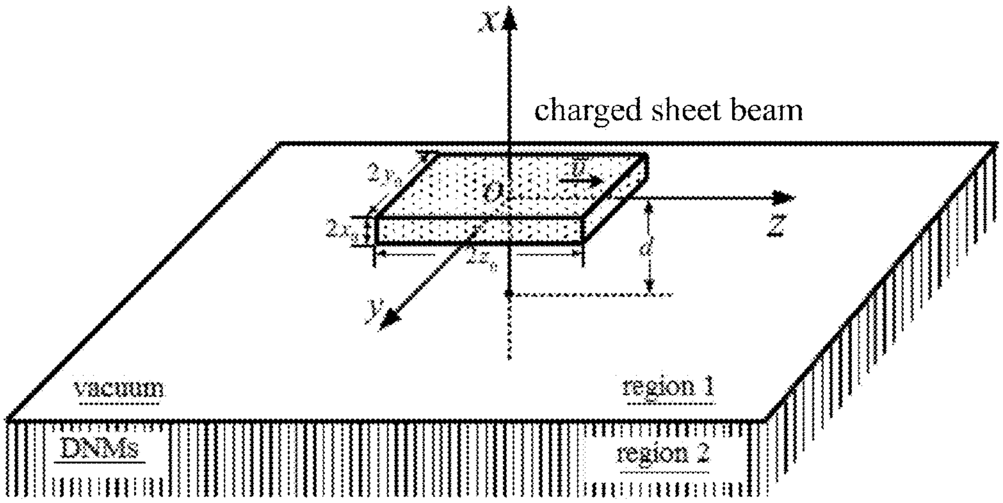
FIG. 6 is a perspective view of Terahertz radiation generated by an electron sheet beam crossing through a vacuum, region 1, above a DNM region, region 2, according to the preferred embodiment of the present invention.

FIG. 5 shows a specific structure of a DNM; under conditions of high frequency and a small size, an electron sheet beam is used to produce a high current. By changing DNM parameters and electron sheet beam parameters, SW amplitude in vacuum, characterized by time-averaged Poynting vector amplitude $|\langle \vec{S} \rangle|$, and reversed Cherenkov radiation energy in the DNM are greatly enhanced. The electron sheet beam is generated by an electron sheet gun and stably transported under actions of a periodic focusing magnetic field. Combining with a diagram shown in FIG. 6, five methods for greatly enhancing the SW amplitude and the reversed Cherenkov radiation energy are following. First two methods are realized by changing the DNM parameters and rest three methods are realized by changing the electron sheet beam parameters.

(1) Increasing a Filling Factor

Figure 7A:
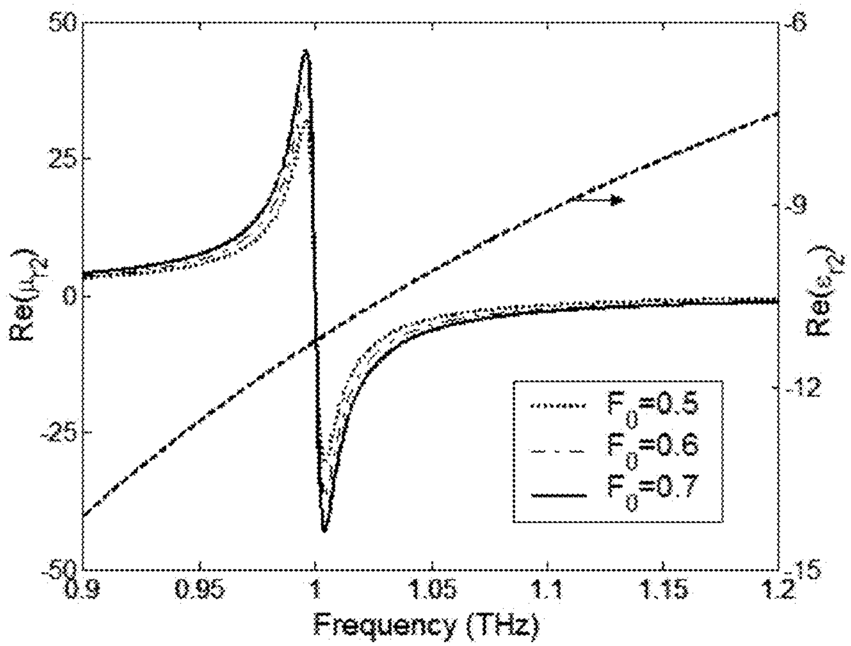
FIG. 7A is a diagram of relative permeability and relative permittivity changing with frequency according to the preferred embodiment of the present invention.
Figure 7B:
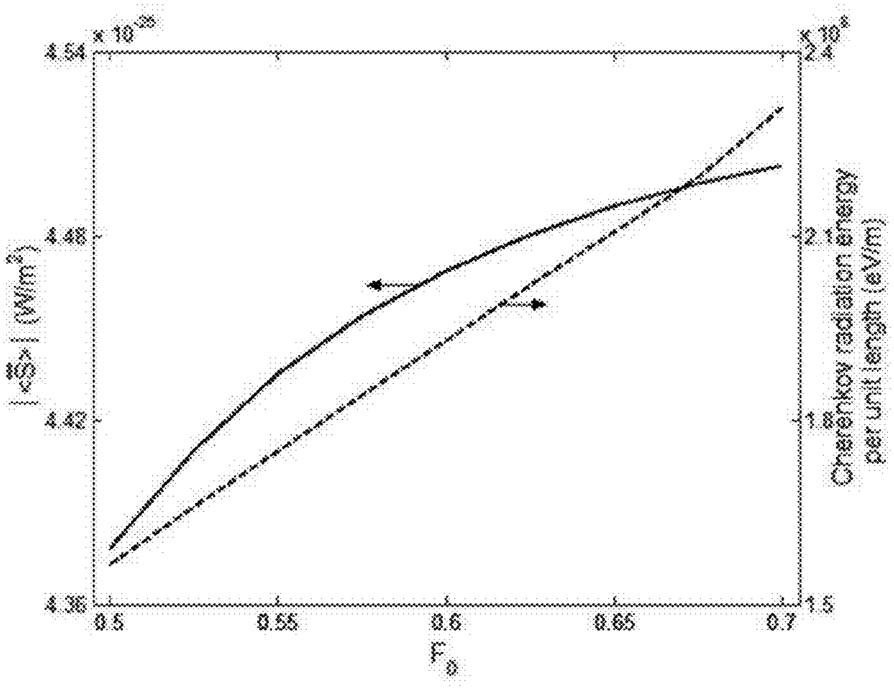
FIG. 7B is a diagram of the time-averaged Poynting vector amplitude at $x=-d/2$ and reversed Cherenkov radiation energy changing with the frequency under conditions of three different filling factors $F_0$ adopted in the SRR according to the preferred embodiment, wherein electronic plasma frequency $\omega_p=2\pi\times3.5\times10^{12}$ rad/s; magnetic resonant frequency $\omega_0=2\pi\times1\times10^{12}$ rad/s; for a convenient analysis, supposing that magnetic loss $\gamma_m$ electric loss $\gamma_e$, i.e., $\gamma_e=\gamma_m=\gamma=5\times10^{10}$ rad/s; parameters of an electron sheet beam $x_0=1$ μm, $y_0=5$ μm, $z_0=10$ μm, $N=5\times10^9$, $\upsilon=0.1c$ and $d=50$ μm; it is noted that resonant frequency is controlled in any desired Terahertz frequency band; c is a velocity of light in vacuum.

Under a premise of keeping the parameters of the electron sheet beam $x_0=1$ μm, $y_0=5$ μm, $z_0=10$ μm, $N=5\times10^9$, $\upsilon=0.1c$ (c is a velocity of light in vacuum) and $d=50$ μm unchanged, for following predetermined parameters of the DNM comprising electronic plasma frequency $\omega_p=2\pi\times3.5\times10^{12}$ rad/s; magnetic resonant frequency $\omega_0=2\pi\times1\times10^{12}$ rad/s; and for a convenient analysis, supposing that magnetic loss $\gamma_m$ equals electric loss $\gamma_e$, i.e., $\gamma_e=\gamma_m=\gamma=5\times10^{10}$ rad/s, by changing metal SRR sizes of the DNM the magnetic resonant intensity thereof is increased, as shown in FIG. 7A. Time-averaged Poynting vector amplitude at $x=-d/2$ in vacuum and reversed Cherenkov radiation energy in the DNM increases with an increasing filling factor $F_0$ between 0 and 1 as shown in FIG. 7B.

(2) Decreasing Loss

Figure 8A:
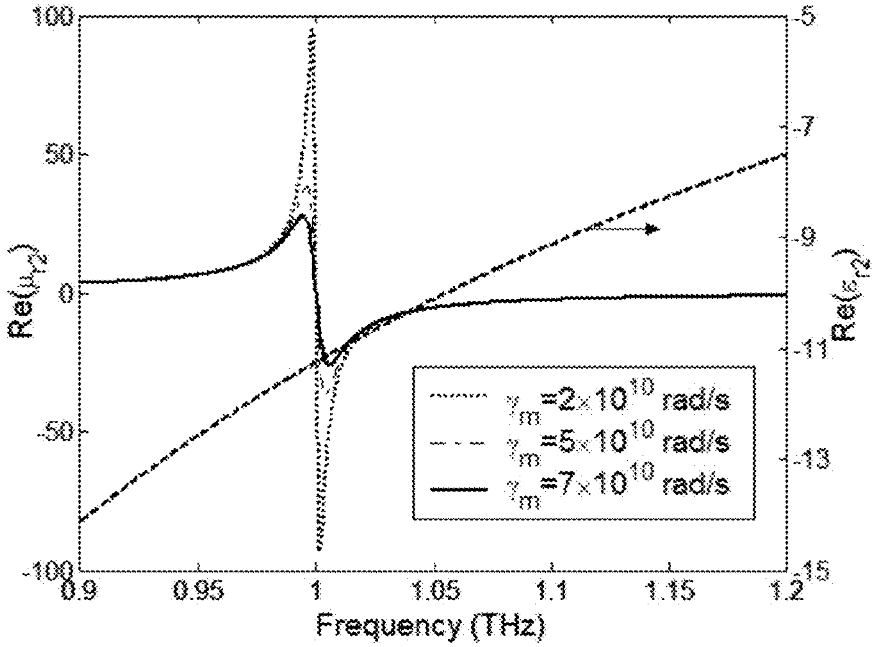
FIG. 8A is a diagram of the relative permeability and the relative permittivity changing with DNM loss according to the preferred embodiment of the present invention.
Figure 8B:
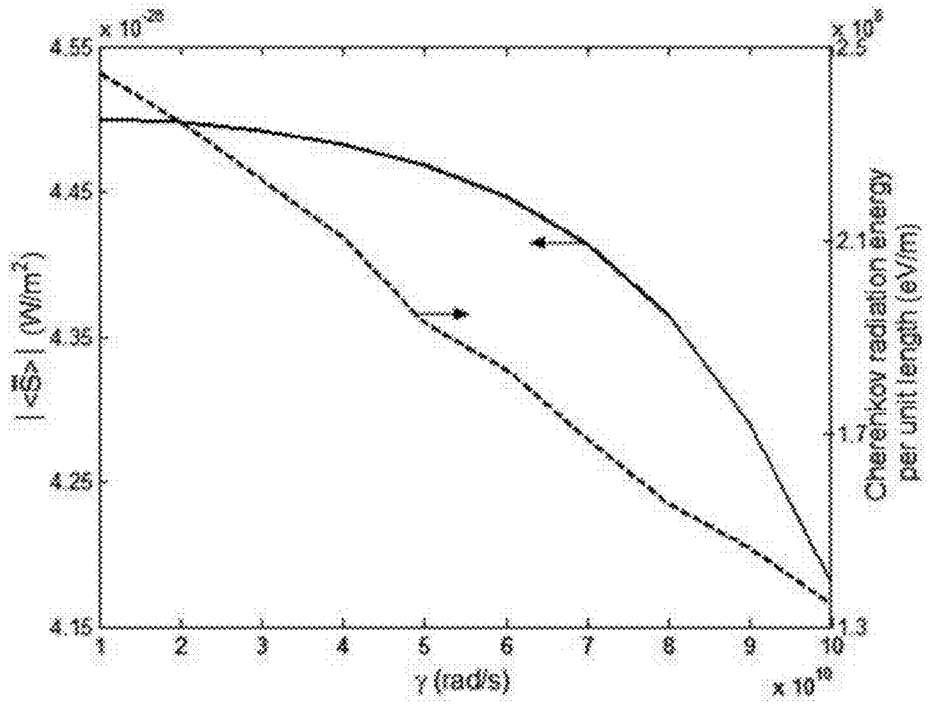
FIG. 8B is a diagram of the time-averaged Poynting vector amplitude at $x=-d/2$ and the reversed Cherenkov radiation energy changing with $\gamma$ according to the preferred embodiment of the present invention, wherein $\omega_0=2\pi\times1\times10^{12}$ rad/s; $\omega_p=2\pi\times3.5\times10^{12}$ rad/s; $\gamma_e=5\times10^{10}$ rad/s; the parameters of the electron sheet beam $x_0=1$ μm, $y_0=5$ μm, $z_0=10$ μm, $N=5\times10^9$, $\upsilon=0.1c$ and $d=50$ μm.

Under a premise of keeping the parameters of the electron sheet beam $x_0=1$ μm, $y_0=5$ μm, $z_0=10$ μm, $N=5\times10^9$, $\upsilon=0.1c$ and $d=50$ μm unchanged, for the predetermined DNM parameters $\omega_0=2\pi\times1\times10^{12}$ rad/s, $\omega_p=2\pi\times3.5\times10^{12}$ rad/s, and $\gamma_e=5\times10^{10}$ rad/s, by choosing different dielectric materials and metal materials the magnetic loss $\gamma_m$ of the DNM is decreased to further increase magnetic resonant performance thereof as shown in FIG. 8A. With decreasing $\gamma$, the time-averaged Poynting vector amplitude at $x=-d/2$ in the vacuum and the reversed Cherenkov radiation energy in the DNM increase, as shown in FIG. 8B.

(3) Increasing the Electron Number of the Electron Sheet Beam

Figure 9A:
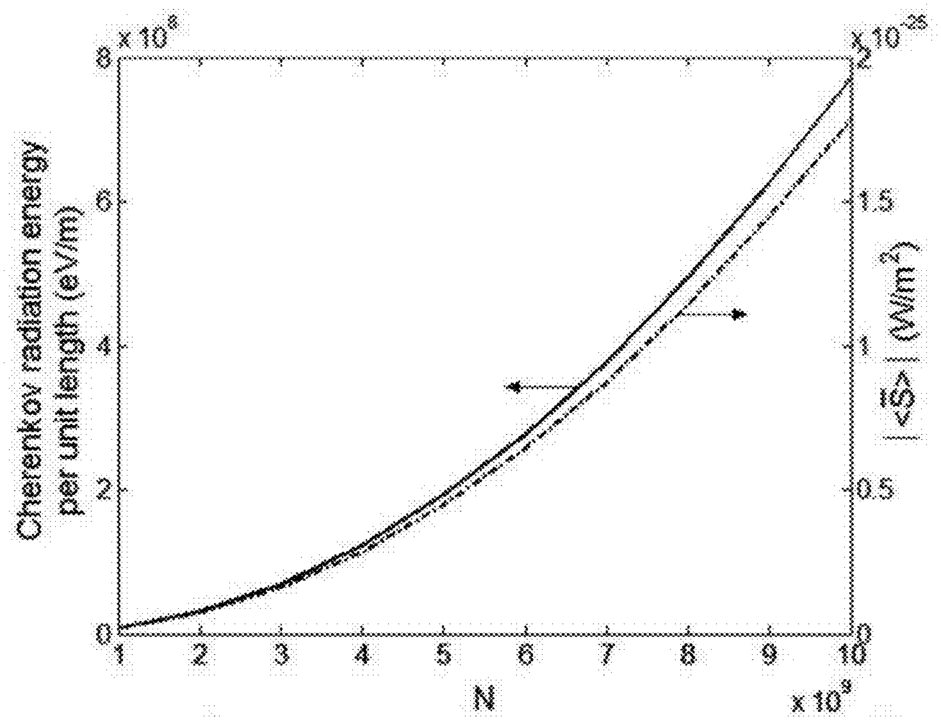
FIG. 9A is a diagram of the time-averaged Poynting vector amplitude at $x=-d/2$ in vacuum and the reversed Cherenkov radiation energy in the DNM affected by an electron number of the electron sheet beam according to the preferred embodiment of the present invention, wherein $\omega_0=2\pi\times1\times10^{12}$ rad/s; $\omega_p=2\pi\times3.5\times10^{12}$ rad/s; $\gamma_e=\gamma_m=\gamma=5\times10^{10}$ rad/s; the parameters of the electron sheet beam $x_0=1$ μm, $y_0=5$ μm, $z_0=10$ μm, $\upsilon=0.1c$ and $d=50$ μm.

Under a premise of keeping the DNM parameters $\omega_0=2\pi\times1\times10^{12}$ rad/s, $\omega_p=2\pi\times3.5\times10^{12}$ rad/s and $\gamma_e=5\times10^{10}$ rad/s unchanged, for the predetermined parameters of the electron sheet beam, $x_0=1$ μm, $y_0=5$ μm, $z_0=10$ μm, $\upsilon=0.1c$ and $d=50$ μm, by changing the electron number N of the electron sheet beam radiation performance is changed. It is worthy to be noted that dimensions of the electron beam must be smaller than an operation wavelength. When N increases, the time-averaged Poynting vector amplitude at $x=-d/2$ in the vacuum and the reversed Cherenkov radiation energy in the DNM are obviously enhanced and the reversed Cherenkov radiation energy increases by square orders of magnitude with the increasing N, as shown in FIG. 9A.

(4) Increasing a Transverse Dimension of the Electron Sheet Beam

Figure 9B:
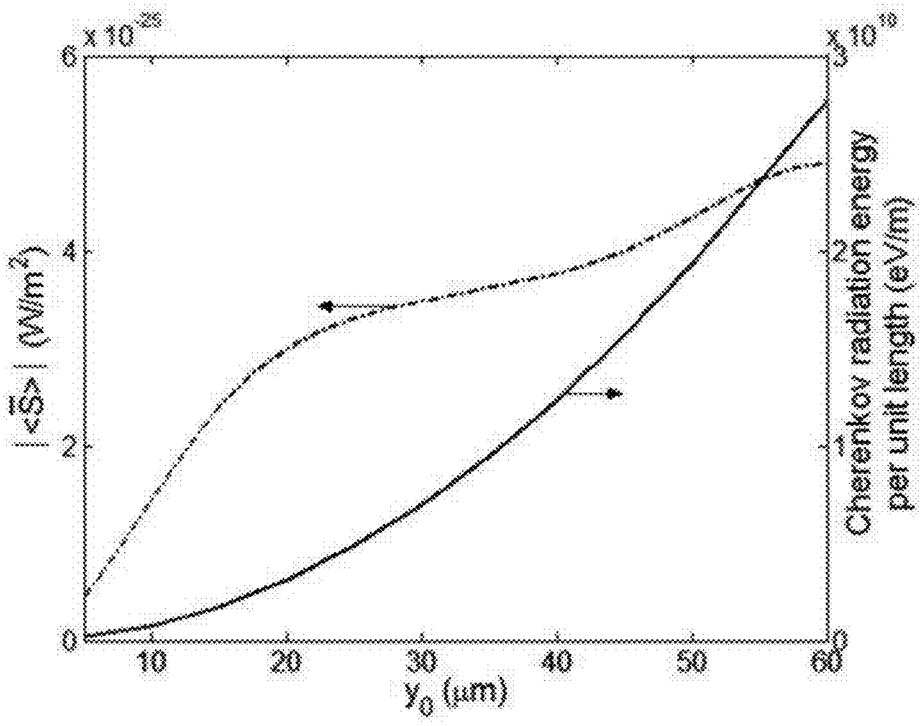
FIG. 9B is a diagram of the time-averaged Poynting vector amplitude at $x=-d/2$ in vacuum and the reversed Cherenkov radiation energy in the DNM affected by a transverse dimension $y_0$ of the electron sheet beam according to the preferred embodiment of the present invention, wherein $\omega_0=2\pi\times1\times10^{12}$ rad/s; $\omega_p=2\pi\times3.5\times10^{12}$ rad/s; $\gamma_e=\gamma_m=\gamma=5\times10^{10}$ rad/s; the parameters of the electron sheet beam $x_0=1$ μm, $z_0=10$ μm, $N=5\times10^9$, $\upsilon=0.1c$ and $d=50$ μm.

Under a premise of keeping the DNM parameters $\omega_0=2\pi\times1\times10^{12}$ rad/s, $\omega_p=2\pi\times3.5\times10^{12}$ rad/s and $\gamma_e=5\times10^{10}$ rad/s unchanged and a current density of the electron sheet beam unchanged, for the predetermined parameters of the electron sheet beam $x_0=1$ μm, $z_0=10$ μm, $N=5\times10^9$, $\upsilon=0.1c$ and $d=50$ μm, by changing the transverse dimension $y_0$ of the electron sheet beam radiation performance thereof is changed. For example, when $y_0$ increases 10 times, the time-averaged Poynting vector amplitude at $x=-d/2$ in the vacuum and the reversed Cherenkov radiation energy in the DNM increase respectively about 10 times and 100 times, as shown in FIG. 9B.

(5) Providing the Electron Sheet Beam Moving Possibly Close to the DNM

Figure 10:
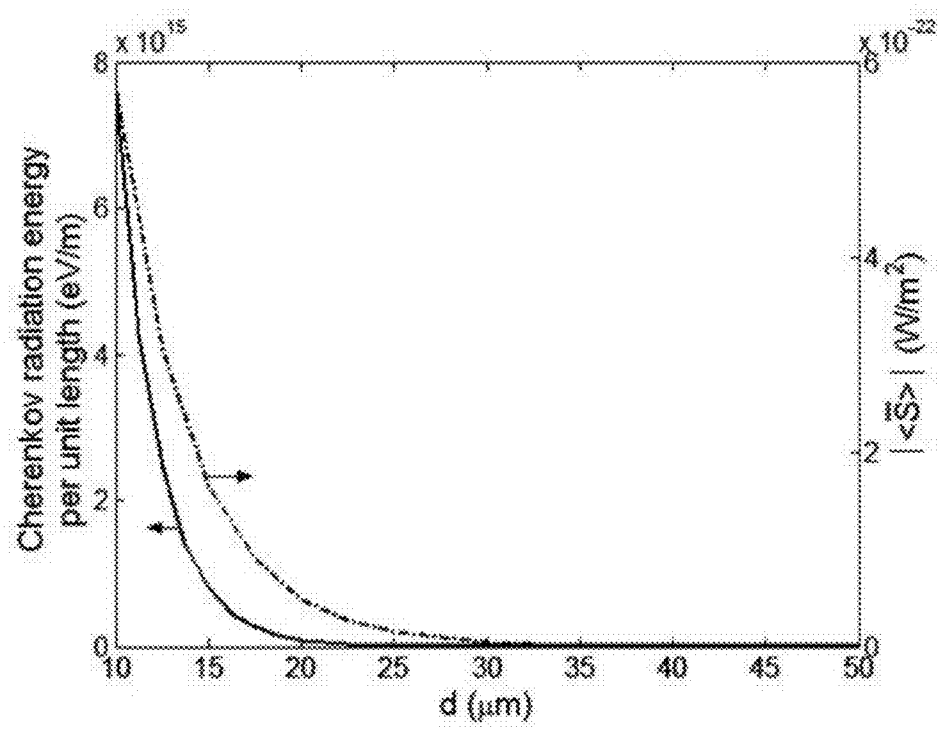
FIG. 10 is a diagram of the time-averaged Poynting vector amplitude at $x=-d/2$ in vacuum and the reversed Cherenkov radiation energy in the DNM affected by a distance d between the electron sheet beam and an interface of the DNM and the vacuum according to the preferred embodiment of the present invention, wherein $\omega_0=2\pi\times1\times10^{12}$ rad/s; $\omega_p=2\pi\times3.5\times10^{12}$ rad/s; $\gamma_e=\gamma_m=\gamma=5\times10^{10}$ rad/s; the parameters of the electron sheet beam $x_0=1$ μm, $y_0=5$ μm, $z_0=10$ μm, $N=5\times10^9$ and $\upsilon=0.1c$.

Under a premise of keeping $\omega_0=2\pi\times1\times10^{12}$ rad/s, $\omega_p=2\pi\times3.5\times10^{12}$ rad/s and $\gamma_e=5\times10^{10}$ rad/s unchanged, for following parameters of the electron sheet beam $x_0=1$ μm, $y_0=5$ μm, $z_0=10$ μm, $N=5\times10^9$ and $\upsilon=0.1c$, by changing a distance d between the electron sheet beam and an interface of the DNM and the vacuum radiation performance is changed. When d decreases, the time-averaged Poynting vector amplitude at $x=-d/2$ in the vacuum is enhanced and the reversed Cherenkov radiation energy in the DNM is also greatly enhanced, as shown in FIG. 10.

After a further comparison, effective methods for greatly enhancing the SW amplitude and the reversed Cherenkov radiation energy in the DNM are replacing normal dielectric materials with the DNM and increasing the electron number N of the electron sheet beam, based on which small-sized and high power Terahertz radiation sources and Cherenkov particle detectors and emitters are accessible.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for generating high power electromagnetic radiation based on a DNM (Double-negative metamaterial), comprising providing an electron beam moving in a vacuum close to an interface between the DNM and the vacuum at a predetermined average speed, so as to generate coherent high power radiation;

wherein the electron beam has following parameters: an electron number at least $1*10^9$; each dimension of the electron beam which is smaller than an operation wavelength; a distance between the electron beam and the interface which is between 10 μm and 35 μm.

2. The method, as recited in claim 1, wherein the desired average speed is larger than a phase velocity of an electromagnetic wave propagating in the DNM which is cubic, cylindrical or wedge-shaped.

3. The method, as recited in claim 1, wherein the electron beam is one member selected from a group consisting of a cylindrical electron beam, an electron sheet beam and an elliptical electron beam.

4. The method, as recited in claim 1, further comprising enhancing both an SW (surface wave) amplitude and reversed Cherenkov radiation energy by changing parameters of the DNM and the parameters of the electron beam.

5. The method, as recited in claim 4, wherein changing the parameters of the DNM comprises increasing a filling factor and decreasing loss, wherein increasing the filling factor is realized by changing a size of a metal SRR (split-ring resonator) of the DNM to increase magnetic resonant intensity thereof; decreasing loss is realized by choosing different dielectric materials and metal materials to decrease magnetic loss $\gamma_m$ of the DNM, so as to further increase magnetic resonant performance thereof.

6. The method, as recited in claim 4, wherein the parameters of the electron beam are changed by increasing the electron number of the electron beam, increasing a transverse dimension of the electron beam and providing the electron beam moving closer to the DNM.

7. The method, as recited in claim 1, wherein the DNM is an isotropic double-negative metamaterial comprising a plurality of unit cells periodically arranged along three-dimensional directions of a rectangular coordinate system respectively, wherein each unit cell is formed by fixing a metal SRR, a symmetrical ring, a nested ring, an S-shaped resonant ring or an Ω-ring resonant structure and wire on two faces of a dielectric substrate respectively.

8. The method, as recited in claim 5, wherein the filling factor of the DNM is between 0 and 1; the magnetic loss of the DNM is between $1*10^{10}$ and $10*10^{10}$ rad/s.

* * * * *